US007240094B2

(12) United States Patent
Hackney et al.

(10) Patent No.: US 7,240,094 B2
(45) Date of Patent: Jul. 3, 2007

(54) METHOD AND SYSTEM FOR SYNCHRONIZING AND SERVING MULTIMEDIA IN A DISTRIBUTED NETWORK

(75) Inventors: Michael L. J. Hackney, Groton, MA (US); Edward J. Burke, Melrose, MA (US); Daniel L. Maxwell, Natick, MA (US); Robert H. Miner, Concord, MA (US); Ronald Thomson, Sharon, MA (US)

(73) Assignee: Centra Software Inc., Lexington, MA (US)

( * ) Notice: Subject to any disclaimer, the term of this patent is extended or adjusted under 35 U.S.C. 154(b) by 801 days.

(21) Appl. No.: 09/939,931

(22) Filed: Aug. 27, 2001

(65) Prior Publication Data

US 2002/0065926 A1    May 30, 2002

Related U.S. Application Data

(63) Continuation of application No. 08/888,027, filed on Jul. 3, 1997, now abandoned.

(51) Int. Cl.
*G06F 15/13* (2006.01)
(52) U.S. Cl. .................... 709/205; 715/500.1; 715/716; 434/118
(58) Field of Classification Search ................ 709/205; 715/500.1, 716; 434/118
See application file for complete search history.

(56) References Cited

U.S. PATENT DOCUMENTS

| 5,896,128 | A | * | 4/1999 | Boyer | 715/716 |
| 5,953,005 | A | * | 9/1999 | Liu | 715/500.1 |
| 6,064,379 | A | * | 5/2000 | DeMoney | 715/500.1 |
| 6,162,060 | A | * | 12/2000 | Richard et al. | 434/118 |
| 6,567,844 | B2 | * | 5/2003 | Fukasawa | 709/205 |

\* cited by examiner

*Primary Examiner*—Jinsong Hu
(74) *Attorney, Agent, or Firm*—Wolf, Greenfield & Sacks, P.C.

(57) ABSTRACT

It is an object of the present invention to provide a synchronized program delivery of training and self-paced learning a communication network. It is another object of the invention to create a virtual classroom available to clients over a distributed network, thus decreasing the cost of education by eliminating travel costs. The invention provides a delivery environment simulating a classroom including functions for synchronized viewing of multimedia content and shared multimedia objects. A system and method is provided for synchronizing and serving multimedia content in a distributed network. In one aspect there is a synchronization server, a content server, and at least one client. The synchronization server provides indication of an update to a multimedia resource to the client. The content server provides content information to the client based upon the indication provided by the synchronization server.

9 Claims, 17 Drawing Sheets

METHOD AND SYSTEM FOR SYNCHRONIZING AND SERVING MULTIMEDIA IN A DISTRIBUTED NETWORK

FIELD OF THE INVENTION

The present invention relates to a system and method for synchronizing and serving multimedia information in a distributed computer network.

BACKGROUND OF THE INVENTION

Many uses have arisen for distributed communication networks and systems, including viewing multimedia data such as documents, images, audio, and video from remote locations. Client-server systems operating over distributed networks have become a common solution for communicating information between people.

One such client-server system includes a multimedia server for distributing multimedia content to a number of clients. Generally, multimedia is provided by a server to clients using existing communication protocols such as the Transmission Control Protocol/Internet Protocol (TCP/IP), such as on the Internet. A number of clients execute a multimedia application program which allows the clients to view multimedia content provided by the server.

An example use for multimedia in communication networks is for multi-user systems such as distance learning and conferencing systems and other collaborative tools. These multi-user systems allow a number of users to interact and share multimedia resources, saving travel costs and leveraging existing corporate communication resources. A distributed multimedia communication application that provides real-time communication should address the problem of delivering time-sensitive, mission-critical information and training to a geographically dispersed workforce. In addition, an effective online training delivery environment would enable corporate professionals to learn at their desks, mobilizing skills that keep businesses competitive.

One problem existing in multi-user systems includes the synchronization of shared resources, such as a whiteboard that may be updated by participants in real time. Another problem is that media data takes different forms, such as audio, text, application data, and the like, which introduces additional complexity to a synchronization mechanism. Also, with the emergence of the publicly-available TCP/IP networks, such as the Internet, it would be beneficial for a program to be able to communicate over the Internet using available computer languages and communication protocols.

SUMMARY OF THE INVENTION

The present invention provides a mechanism for synchronizing the delivery of multimedia information, for example, for training and self-paced learning, within a communication network. An example use of the invention is for a virtual classroom available to clients on the Internet, thus decreasing the cost of education by eliminating travel costs. The invention provides a synchronized multimedia delivery environment which may be used to simulate a classroom, and which includes functions for synchronized viewing of multimedia content and shared multimedia objects. An embodiment of the invention may be implemented as an object-oriented program that renders multimedia data in an integrated browser-based environment.

One aspect of the invention is directed to a system and method for synchronizing and serving multimedia content in a distributed network. In one aspect of the invention, there is a synchronization server, a content server, and at least one client. The synchronization server provides a location of a multimedia resource to the client. The content server provides content information to the client based upon the location provided by the synchronization server.

According to another aspect of the invention, the system includes a plurality of clients. In this embodiment, the synchronization server maintains synchronization information for a shared resource. One of the plurality of clients modifies the shared resource by providing modification information and an indication of the shared resource. The synchronization server updates the shared resource according to the modification information and produces an update to the shared resource and the indication. The synchronization server communicates updated information to the plurality of clients, wherein the updated information includes the indication of the updated shared resource.

According to another aspect of the invention, the synchronization server is a multitasking system that executes a plurality of processes. Each of the plurality of processes is capable of processing distributed events generated by each of the clients, and synchronizing the distributed events.

According to another aspect of the invention, the distributed events update a shared resource, and the distributed events are processed by the synchronization server in the order received by the synchronization server.

According to another aspect of the invention, the system represents a computer-based course, the system includes a database server, a course editor, a course content server, and at least one client. A user organizes a plurality of multimedia resources into a course through the course editor and enters resource information for each of the plurality of resources into an object database located on the database server. The course editor allows a user to create entries in the database server including available course information for each of a plurality of available courses, and to produce identification information for each of the plurality of courses for entry into the object database.

In another embodiment of the invention, a client executes a query on the database server to determine available course information. Based on a selection of a desired course from the plurality of available courses, the client executes a query on the database server to determine a location for the desired course. The database server then provides the location of the desired course to the client. The course content server provides course content information to the client based upon the location provided by the database server.

In another embodiment of the invention, a client executes a query on the database server to determine at least one multimedia reference associated with a desired course. Based upon a selection of a desired multimedia resource from the at least one multimedia reference, the database server then provides a location of the desired multimedia resource to the client.

In another embodiment of the invention, the client executes a query on the database server through a plurality of distributed objects, wherein at least one distributed object located on the client forwards the query to at least one distributed object located on the database server, the at least one distributed object located on the database server executing the query on directly on the database server, and providing a response to the at least one distributed object located on the client.

DETAILED DESCRIPTION

The present invention will be more completely understood through the following detailed description which should be read in conjunction with the attached drawings in which similar reference numbers indicate similar structures. All references cited herein are hereby expressly incorporated by reference.

Figure 1:
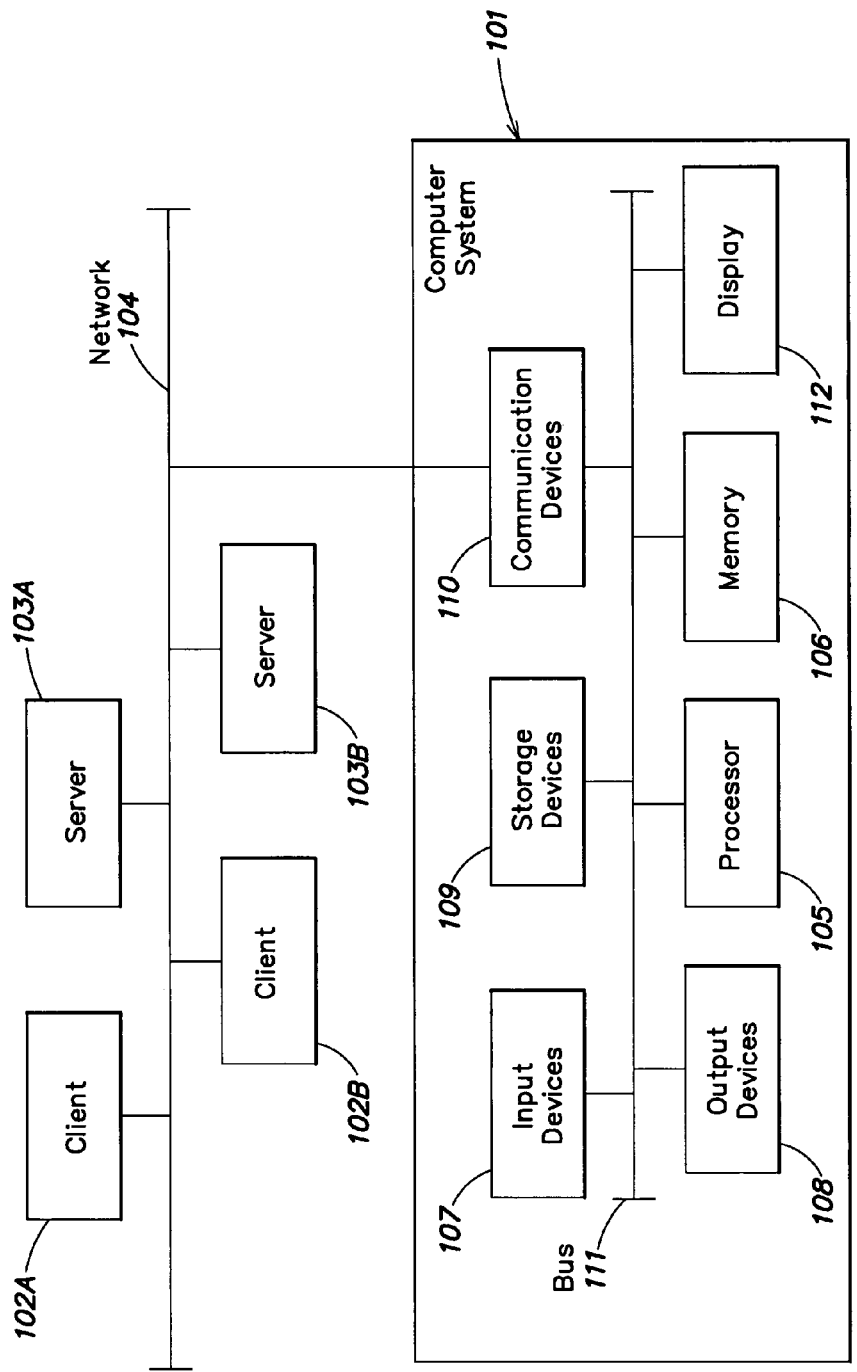
FIG. 1 is a block diagram of a distributed computer network which may be used to implement the present invention.

An example computer system which may be used to practice the present invention is depicted in FIG. 1. The computer system 101 includes a processor 105 connected to one or more storage devices 109, such as a disk drive. The computer system also includes one or more output devices 108, such as a monitor or graphic display 112, or printing device (not shown). The computer system 101 typically includes a memory 106 for storing programs and data during operation of the computer system 101. In addition, the computer system may contain one or more communication devices 110 that connect the computer system to a communication network 104.

Computer system 101 may be a general purpose computer system that is programmable using a high level computer programming language. The computer system may also be implemented using specially programmed, special purpose hardware. In the computer system 101, the processor 105 is typically a commercially available processor, such as the PENTIUM® microprocessor from the Intel Corporation, PowerPC microprocessor, SPARC processor available from Sun Microsystems, or 68000 series microprocessor available from Motorola. Many other processors are available. Such a processor usually executes an operating system which may be, for example, the DOS, WINDOWS 95, or WINDOWS NT available from the Microsoft Corporation, MAC OS SYSTEM 7 available from Apple Computer, SOLARIS available from Sun Microsystems, NetWare available from Novell Incorporated, or UNIX available from various sources.

The communication network 104 may be an ETHERNET network or other type of local or wide area network (LAN or WAN), a point-to-point network provided by telephone services, or other type of communication network. Information consumers and providers, referred to as client 102 and server 103 systems, respectively, communicate through the network 104 to exchange information. Computer system 101 may be configured to perform as a client 102 or server 103 system or both on the network 104. A server 103A may store structured documents on a storage device 109 located on the server 103A. The server may also provide these structured documents to one or more client systems 102 in response to a request generated by a client 102A through the network 111. Similarly, structured documents may be created, edited, viewed, or converted on such client 102 and server 103 systems.

It should be understood that the invention is not limited to a particular computer system platform, processor, operating system, or network. Also, it should be apparent to those skilled in the art that the present invention is not limited to a specific programming language or computer system and that other appropriate programming languages and other appropriate computer systems could also be used.

The present invention may be programmed using an object-oriented programming language, such as Smalltalk, JAVA, or C++. In object-oriented programming, code and data that are related may be combined into objects. An object is an instance of an entity that embodies both specific data and the functions that manipulate it. In object-oriented programming, an object is an entity that has state, behavior and identity. Objects are created, or instantiated, during the execution of an object-oriented program wherein instances of objects are created. Objects are typically created in class hierarchies, and the methods and/or data structures of objects are inherited through the hierarchy. It should be understood that the present invention may be implemented in any object-oriented programming language suitable for synchronizing multimedia delivery over a distributed network. In addition, the invention may be implemented using functional programming.

Figure 2:
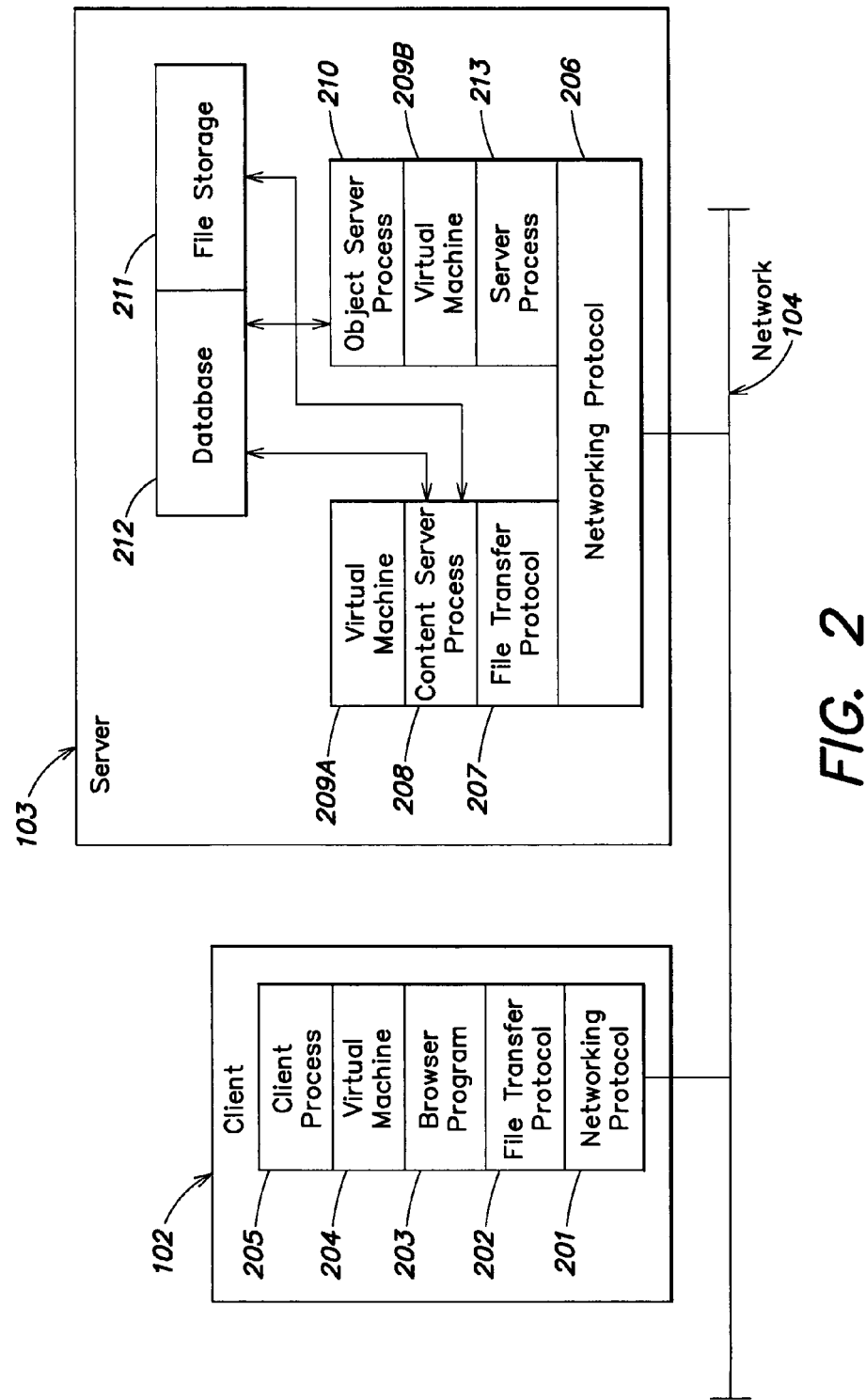
FIG. 2 is a block diagram depicting a client-server system in one embodiment of the present invention.

A more detailed block diagram of a client-server system implementing the present invention is shown in FIG. 2. A client that is suitable for implementation of the present invention typically includes a networking protocol 201 and file transfer protocol 202 used for transferring information such as Hypertext Markup Language (HTML) documents between a client 102 and a server 103. An example of such a networking protocol 201 includes a TCP/IP networking protocol used to communicate over the Internet and other computer networks. In addition, the client 102 includes a file transfer protocol 202. A typical file transfer protocol 202 used on such a client includes the Hypertext Transfer Protocol (HTTP).

HTML is a markup language used to create a structured document having content and structure. HTML defines elements which form a logical, predictable, structure. Specifically, in an HTML document, tags or codes encapsulate content forming elements. A Document Type Definition (DTD) of HTML establishes the structure of a markup document of a particular type, and provides a framework for the kinds of elements that constitute a document of that type. The markup of a structured document is interpreted as an ordered hierarchy of markup elements when, taken together, form a tree or similar hierarchical object. In such a document, markup elements include tags and their content, such as text, graphics, still images or other media.

As discussed above, HTML documents may be transferred using the Hypertext Transfer Protocol (HTTP). The Hypertext Transfer Protocol (HTTP) is a protocol used by World Wide Web (WWW) browsers and servers on the Internet, for example, to exchange information. The protocol makes it possible for a user to operate a browser program 203 by entering a location of a structured document or other resource to retrieve text, graphics, sound and other multimedia information from a web server. As is known, the HTTP file transfer protocol 202 defines a set of commands and user strings for a command language. An HTTP transaction consists of a connection, a request, a response, and a close.

Using the HTTP or other transfer protocol, a client obtains a resource from a server 103. The client 102 typically provides a Uniform Resource Locator (URL) which is an address of a resource, in the form protocol:@host@local_info where protocol is the means by which the reference is obtained (such as HTTP, FTP), host specifies the server where the resource resides, and local_info is a string (often a file name) passed to a process at the server specified by the host information.

The client 102 typically executes a program referred to in the art as a browser program 203, that is, a program used to view structured documents such as HTML documents. Generally, the browser program 203 executes a virtual machine 204 which is a pseudo-machine that interprets code written in a virtual machine language. Interpreted languages and virtual machines are well-known in the art of computer programming. Examples of an interpreted language include the Smalltalk and JAVA programming languages available from Sun Microsystems, among others. An example of such a virtual machine 204 includes the JAVA VIRTUAL MACHINE, available from Sun Microsystems.

The virtual machine 204 executes a program, forming a client process 205. The client process 205 is a process executing within the realm of the virtual machine 204. Client process 205 has the capability of communicating with servers, processes on servers, or other client-processes.

The server 103 includes a file transfer program 207 that implements the same networking protocol 206 as the client 102. In addition, server 103 includes a content server process 208 that is used to respond to client requests received through the network 104. Also, server 103 includes a virtual machine 209 that may execute virtual machine programs written in a virtual machine language. The content server process 208 will, upon the request of a client 102, provide multimedia content from a file storage device 211. In addition, client 102 may return data to the server 103 for file storage 211, or for entry in a database 212.

Server 103 also includes an object server process 210 which is created by executing a program in a virtual machine language on the virtual machine 209. In one embodiment of the invention, virtual machines 204 and 209 are JAVA virtual machines. A multimedia delivery system is provided through the client process 205, object server process 210, and content server process 208. The object server process 210 provides synchronization between client and server objects, and maintains the creation and deletion of server objects, such as in a database 212. Server 103 may execute multiple virtual machine processes 209A, 209B. Virtual machine 209B, which executes object server process 210, may communicate through a server process 213. An example server process 213 is remote procedure calls (RPC) which is well-known in the art of programming.

As discussed above, the content server process 208 may be an HTTP server process that provides web server functions. Similarly, server 103 may include a virtual machine 209 that executes virtual machine code, forming an object server process 210. This virtual machine may be a JAVA virtual machine and the object server process 210 may be a JAVA process created by the execution of a JAVA program.

Executable code may take different forms within an HTML document such as a script or a reference to a program. A script is usually a short program including a series of commands that may be interpreted by a processor. Scripts are not compiled; they are executed in a sequence, using constructs such as data storage, loops, and arrays. In addition, an object server process 210 may be created by a program, such as a JAVA program. JAVA program executed on a client virtual machine 204 is typically referred to in the art as a "applet". A JAVA program which is executed by a virtual machine 209 on a server is commonly referred to in the art as a "servlet". The multimedia system implements applets on the client 102 and servlets on the server 103 to provide a number of different functions.

The JAVASCRIPT scripting language is a compact, object-based scripting language for developing client-server Internet applications. JAVASCRIPT program uses built-in, extensible objects, but provides no object classes or inheritance. A browser interprets a JAVASCRIPT program embedded within a structured document. JAVASCRIPT program statements embedded in HTML page may recognize and respond to user events such as mouse selections, form input and page navigation.

The JAVA programming language is a programming language similar to C++. The JAVA programming language is machine independent in that one version of program code may be written for multiple operating systems. As discussed previously, program components written in the JAVA programming language for the Internet are called applets. JAVA applets access code libraries on local clients and can download additional class files from a server on a network. JAVA applets may also communicate with JAVA servlets to perform distributed processing. It should be understood that the present invention is not limited to JAVA and JAVASCRIPT, and that other types of scripting languages and interpretive code may be contained within a structured document for the execution and synchronization of a multimedia server system.

A method for processing HTML files to include such JAVASCRIPT and JAVA programs is described in co-pending U.S. Patent Application entitled "Apparatus and Method for Processing Link Information in a Structured Document" by M. L. J. Hackney et al., filed on Jul. 3, 1997, which is incorporated herein by reference.

Figure 3A:
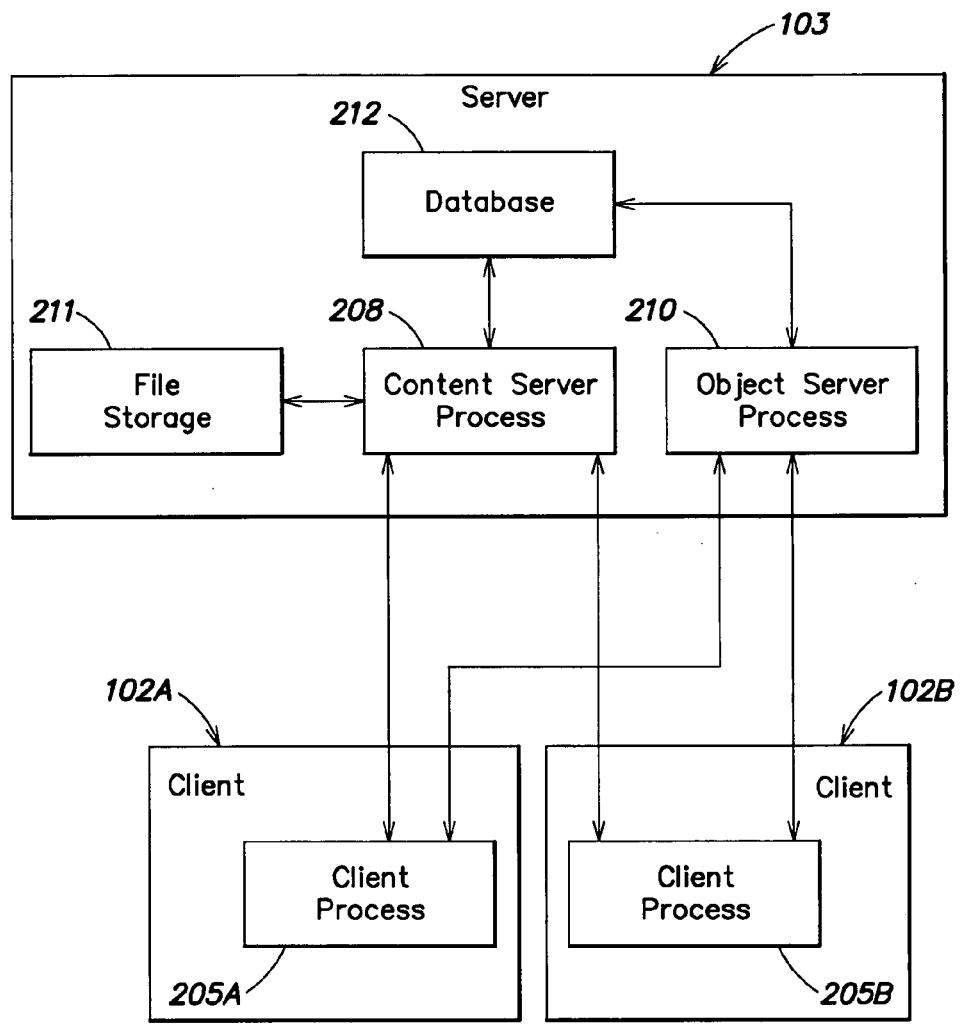
FIG. 3A is a block diagram of one embodiment of a multimedia synchronization system.
Figure 3B:
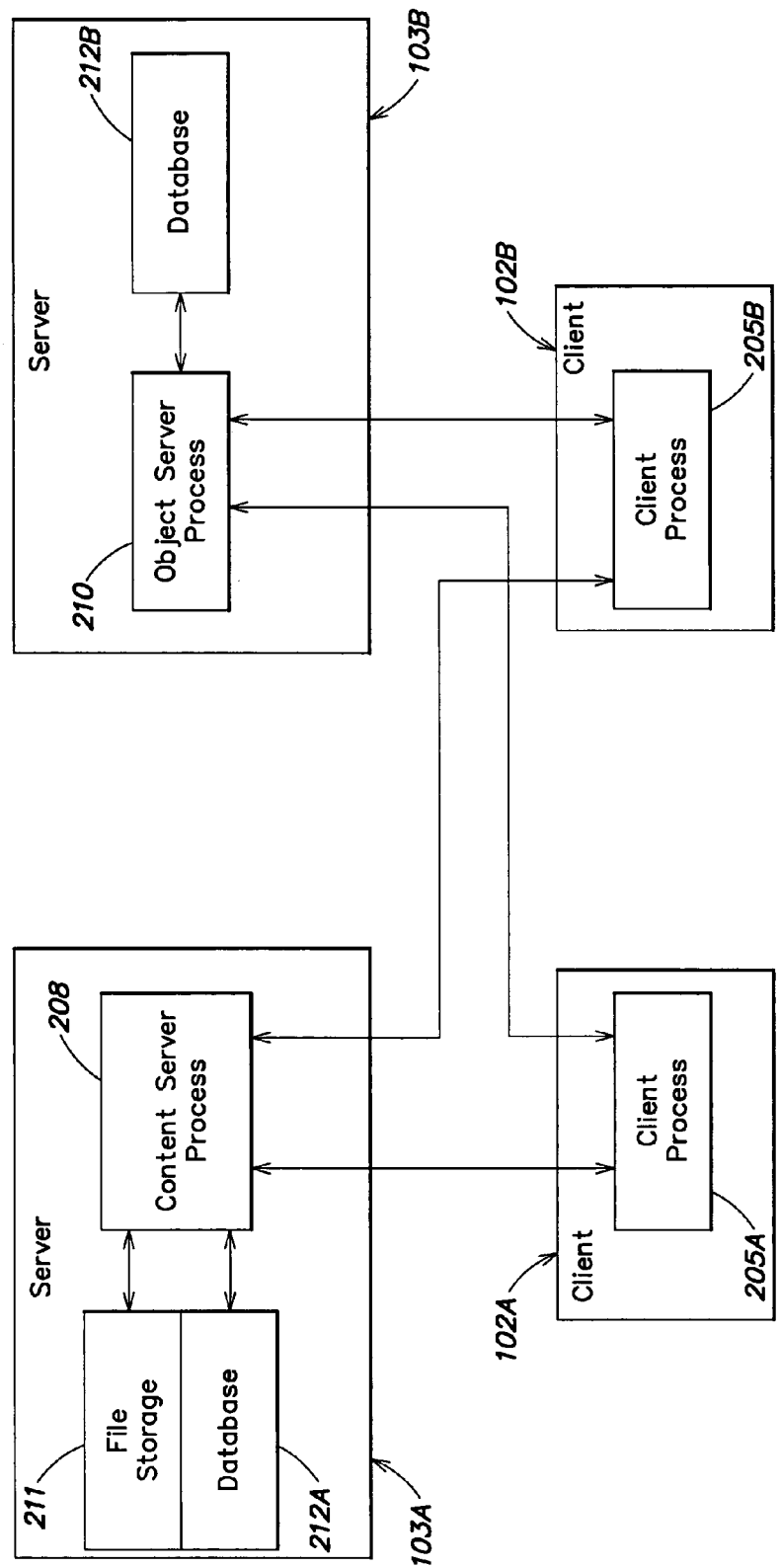
FIG. 3B is a block diagram of another embodiment of a multimedia synchronization system.

Referring to FIG. 3A, the synchronization between clients 102 and the server 103 will now be discussed. The content server process 208 provides multimedia content to a plurality of clients 102. Server 103 also includes a object server process 210 that provides synchronization during delivery of the multimedia content. A client process 205A updates shared multimedia resources, such as resources that may be stored on file storage 211, database 212, or in memory, wherein the server 103 maintains the current state of a shared resource. When the shared resource is updated, server 103 provides an updated shared resource to client process 205B. In FIG. 3B, in an alternative embodiment of the invention, the content server process 208 and the object server process 210 are located on a server 103A and a server 103B, respectively. In this embodiment, there may be different databases 212A and 212B located on servers 103A and 103B, respectively. It is noted that database 212 may be implemented on either server or both.

Figure 4A:
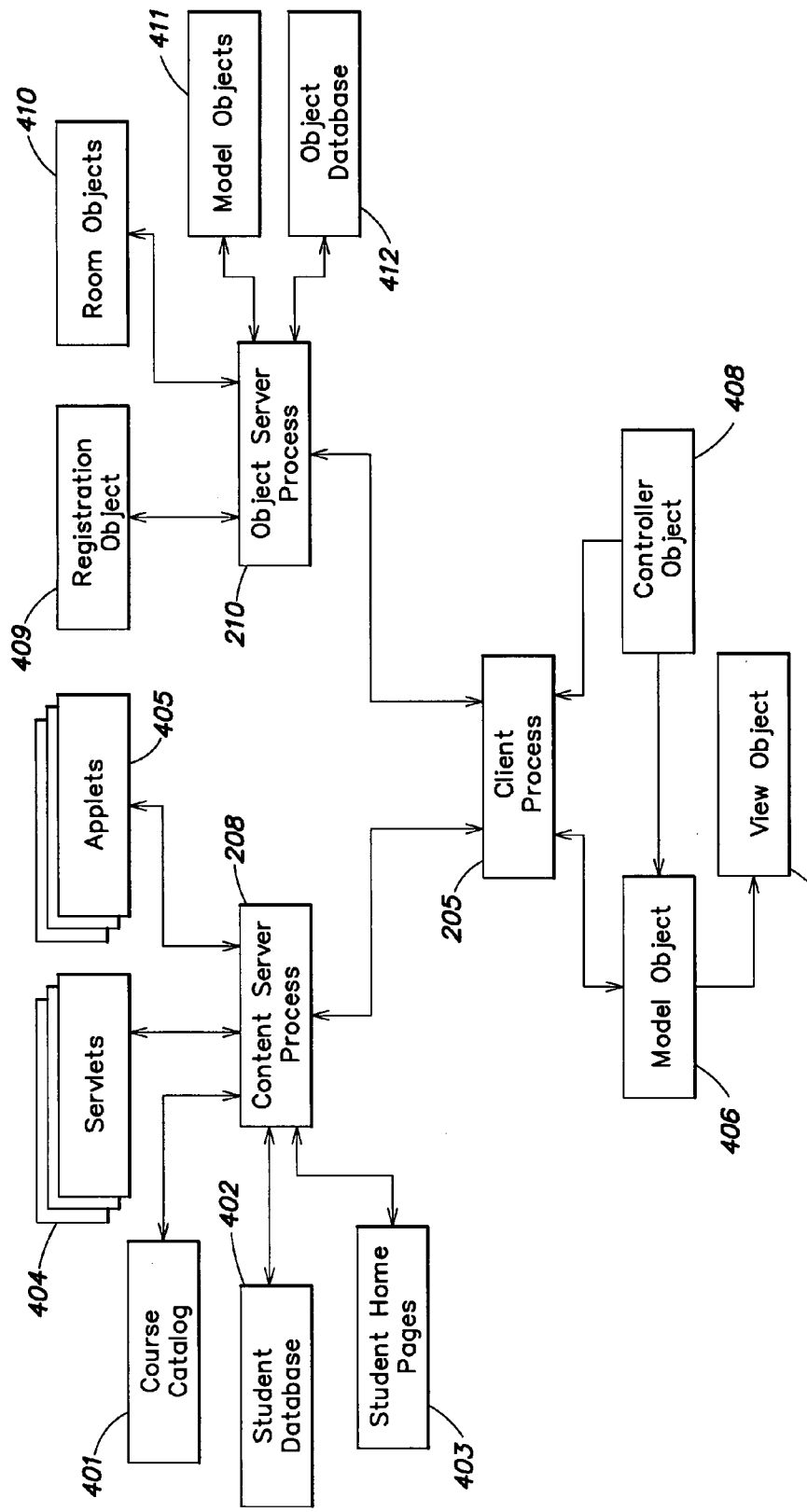
FIG. 4A is a functional block diagram of a multimedia synchronization system.

FIG. 4A shows more details of the multimedia system of one embodiment of the present invention. As discussed above, the content server process 208 provides structured documents, such as HTML documents, to clients 102. In a multimedia delivery system, such as a distance learning multimedia system, the content server process 208 contains documents related to courses. A course is a collection of multimedia data, such as HTML documents, slides, and other static data that may be presented by an instructor and viewed by a student attending the course. A student is a person operating a client computer 102 who participates in the course. An instructor may also operate a client station 102 and participate in a course; however, the instructor is a special type of client, having more control than a student over the sequence and content of the course.

The courses that are made available by the content server process 208 are listed in a course catalog 401, which is a listing or database of courses that are available. The course documents and course catalog are generally stored in file storage 211 or in a database 212 within a server 103. The course catalog 401 may contain a number of course records, the course records containing course information such as course name and course ID. When a student registers for a course, the student may be registered by the content server process 208, i.e., a registration record including student information is added to a registration database.

The server 103 may also include a student database 402, that is, a database of students in courses available on the server 103. The student database 402 contains student records containing information about a student, such as a student name, and E-mail address, a user ID, among other information. Server 103 also includes an object database 412 for storing objects. Various databases on the server may be stored by a central database service that provides access to database 212. Such a database service used for the storage of objects includes the ObjectStore PSE PRO database management system available from ObjectDesign. Other databases are available and may be used. Alternatively, a data file or relational database may be used.

The server also includes a number of servlets 404, or programs which provide various functions in the operation of the multimedia system. The server 103 also includes a number of applets 405 that may be transferred to the client for execution by its virtual machine 204.

Applets 405 are program codes that define classes of objects, when instantiated may provide additional functionality to a browser program 203. For example, there may be a method associated with a course catalog object 401 that loads the database of courses into an HTML file for viewing by a client browser program 203. A registration object may have a method which creates a registration record in the registration database, given student information such as a user ID and student name. A registration object may also have a method for "posting" HTML data to a content server process 208. The "post" method has the ability to transfer data entered into a form of an HTML document to a registration database. Various other methods for performing functions, such as transferring data, may be implemented within the multimedia system.

Applets 405 that are downloaded from the content server process 208 may be executed, and a number of objects may be created in memory on the client 102. These objects may include one or more model 406, view 407, and controller 408 objects. The model, view, and controller relationship, or MVC, is prevalent in the Smalltalk programming language and described in detail in Design Patterns, Addison-Wesley (1985) by E. Gamma, R. Helm, R. Johnson, and J. Vlissides, incorporated herein by reference. The model, view and controller paradigm is typically used in a graphical user interface design. The view represents the view of the graphical interface; the model stores the state of the graphical interface; the controller accepts input to change the state of the model. Upon changing the model state, the view is updated to reflect the state change.

A model may exist in two forms, a client model and a server model, which are subclasses of a model class. The model is a subclass of the observable class that is part of the standard classes in the JAVA language. A server model has a string indicative of its name and a value indicative of whether the model is persistent. A model is persistent if it continues to exist after a last client detaches from it, allowing its state to be preserved for a client that may attach to the model at a later time. A client model includes similar information and also includes an indication of the room to which the client model is attached and the class name of a corresponding server model.

The server model object includes a number of methods associated with it. There is a method referred to as an "onAttachedEvent" method that indicates when a new client has attached to the model. Specifically, the server model is notified of a client attach event after the server sends a client attach event to other clients. An "onSendEvent" method handles an event sent by a corresponding client model. Similarly, there are "onSendRealTimeEvent" and "onSendBinaryEvent" methods for handling real time and binary events, respectively.

The client model object includes similar methods including an "onBroadcastEvent" method used by a model to handle a broadcast event from a client to all clients in a Conference. There is an "onUnicastEvent" method used to handle a unicast event transmitted from one client model object to another client model object.

View 407 and controller 408 objects may differ substantially between models with which they are associated. The controller handles all events from the view that are reflected state changes in the model. In controller has a reference to a model in which the controller can call model methods. An additional controller variable may be used to indicate whether the controller is enabled or disabled.

The model may be an object that holds the current state of an object on the client, that is, an object in memory created by the virtual machine 204. The view may be an object responsible for updating a view of the browser program 203 based on changes observed in the model object 406. Input to the controller object 408 is provided by the browser program 203 and virtual machine 204, executing a JAVASCRIPT program and JAVA applet for monitoring user input, such as selection by a mouse or keyboard input.

Objects on the client 102 communicate through the client process 205 with the object server process 210. Objects server process 210 is responsible for maintaining a number of objects on the server 103 related to the multimedia delivery system. The server 103 includes the registration object 409, which is an object through which all objects register within a course.

A more detailed description of how objects are initialized and linked is described in co-pending U.S. Patent Application, entitled "A Computer System and Process for Dynamically Initializing and Linking Distributed Objects in a Distributed Object System" by M. L. J. Hackney et al., filed on Jul. 3, 1997, which is incorporated herein by reference.

Figure 4B:
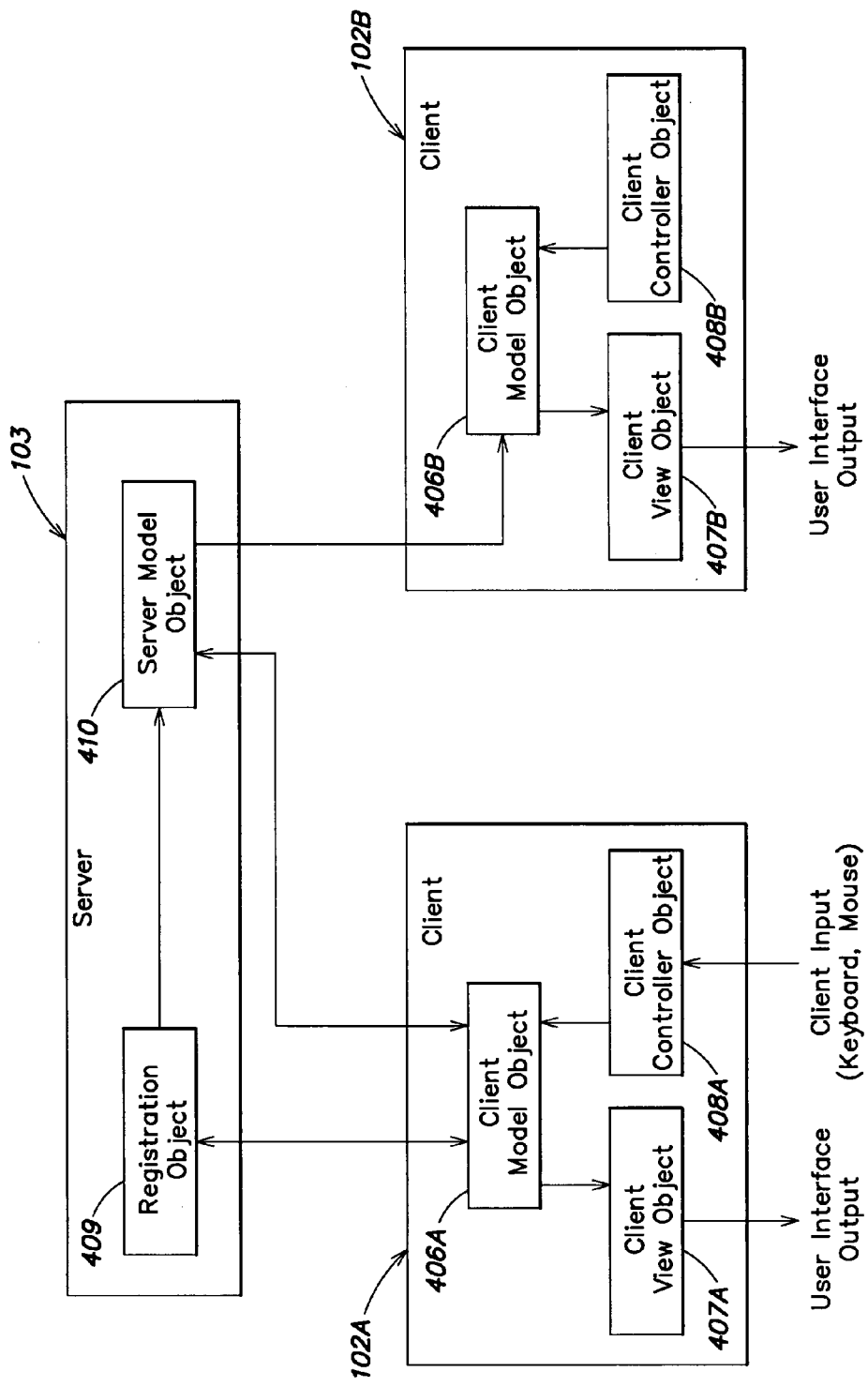
FIG. 4B is a diagram illustrating the client-server model/view/controller relationship.

A course may be referred to in a multimedia environment as a conference which is typically used to describe a meeting for discussion or consultation. A conference being held on a server 103 may include a number of rooms within the conference. In a multimedia environment, rooms may be used to segregate groups of clients within the same conference to simulate a smaller work group. Rooms may be represented by the server 103 as room objects 410. The server 103 also includes a number of model objects 411 that correspond to model objects 406 on the client. As shown in FIG. 4B, and discussed below, model objects 406 are synchronized by model objects 411.

FIG. 4B shows a more detailed diagram of the model/view/controller object relationships used in one embodiment of the present invention. As discussed above, a client 102A creates, or instantiates, a client model 406A, view 407A, and controller 408A object in memory. The client model object 406A maintains the state of a multimedia object on the client. An object may be, for example, a shared resource, such as a whiteboard used by students and instructors to illustrate ideas. When the client model object 406A changes state, the client view object 407A is updated accordingly, and may produce a user interface output such as a view within the browser program 203. A student or instructor operating client 102A may provide input to the model such as from a keyboard or a mouse via the client controller object 408A. The client controller object 408A then provides an update to the client model object 406A.

As discussed previously, server 103 includes a registration object 409, through which all objects register within a particular conference. Also as discussed, the server 103 instantiates a server model object 410 that corresponds to client model object 406A. The client model object 406A is synchronized to the server model object 410 in that their states are synchronized to the same state values as a result of event communicated between client 102A and the server 103.

Events are communicated when a change in the state of an object is observed, either at the client 102A or the server 103. Events may be communicated to other clients, such as client 102B, by broadcasting events to each client 102. Thus, as a student updates a client controller object 408A, producing a change in state of a client model object 406A, an event is generated by client 102A to the server model object 410 requesting a change in state. The server model object 410 then broadcasts (or unicasts to each client) an event indicating to each client 102 to update a corresponding client model object 406B. Then, a change in state of the client model object 406B would produce an update in the client view object 407B and consequently provide a change in the user interface output. It is noted that the client model object 406A may update its local client view object 407A before or after the server model object 410 has been updated.

Events are messages addressed from a client to a target model on a station in the system. Events may contain text or binary information, and may be communicated to one or many clients 102 by the server 103. Clients 102 and servers 103 use the information within event messages to update and communicate between objects.

There are different types of events. A model attach event is a request for attaching a client model object to a server model object. When model objects are attached, their status are synchronized. Similarly, a model detach event detaches one model object from another model object. Also, there are send events used to communicate information between objects, such as string and binary information. For sending events that must be conveyed with a minimum delay, there are real time events. Real time events may be used to transfer real time information such as audio streaming data. More events are generated by a client 102 when a client model moves to another "room" on the server 103, as described in detail below.

Text information within an event may be, for example, a string representing a URL, or location to a resource on the network. The object server process 210 may provide resource locations to a client browser program 203 for loading multimedia data. The events generated by the server 103 may be used to update a local client model, that is, a resource location string may be sent to the client 102 to direct the browser program 203 to load an updated multimedia resource.

A system may process events in a certain order, such as a queue. One such method is referred to as "FIFO" queue or first-in, first out queue. That is, the first event into an event queue is the first event to be processed. In one embodiment, events may be processed in the order they are received. In another embodiment, the object server process 210 may be implemented in a multitasking operating system, a server may execute many processes simultaneously, each process handling events. The object server process 210 may also be a single process or a single process with multiple "threads." A thread is a single path of execution. A multithreaded event processor (or handler) may process many events at once, and may prioritize threads so that higher priority events are processed before other threads. In fact, a single thread may be assigned to process events from a single student, or room, or the like. Multithreading is well-known in the art of computer programming.

Figure 4C:
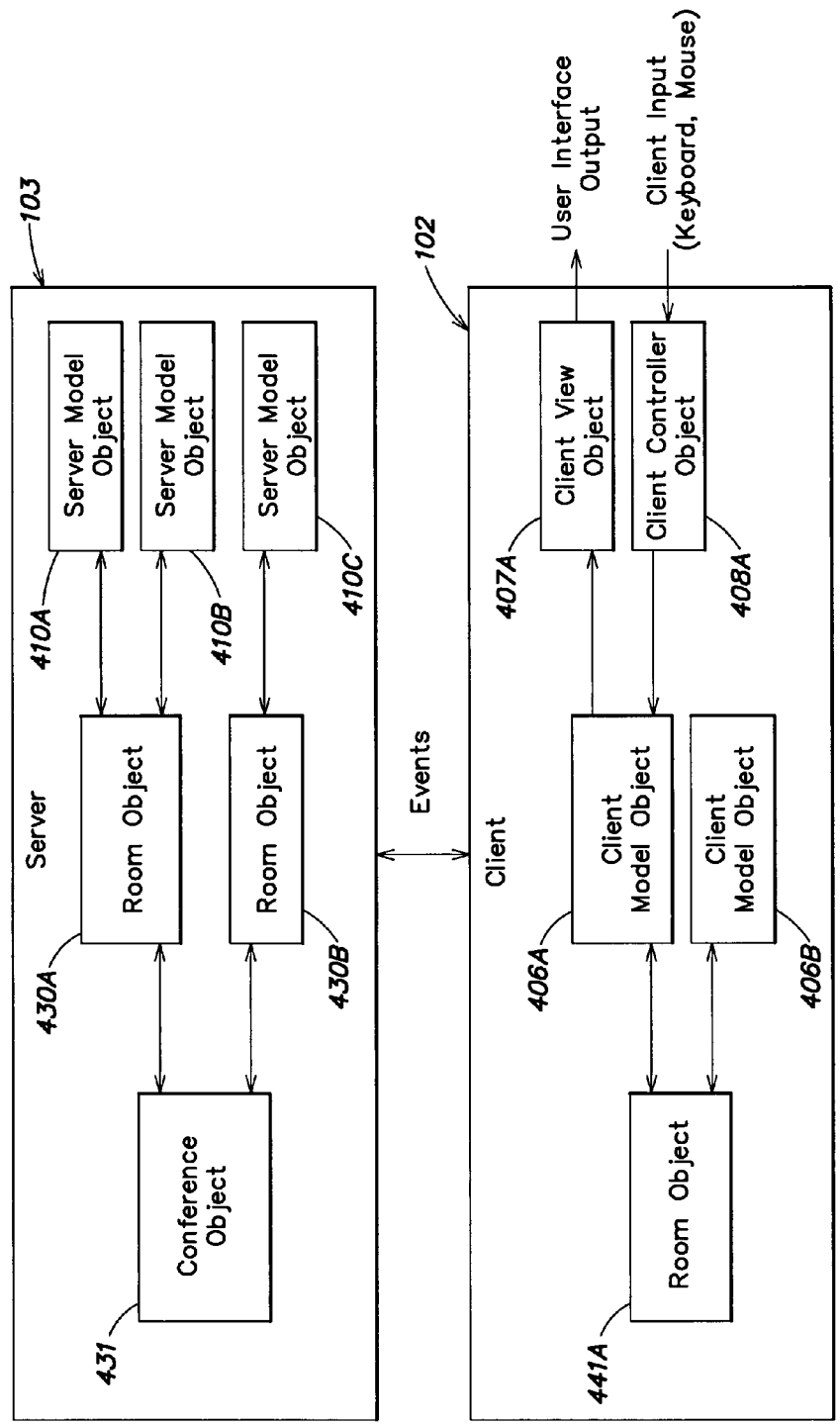
FIG. 4C is a block diagram of server and client objects and their relationships.
Figure 5:
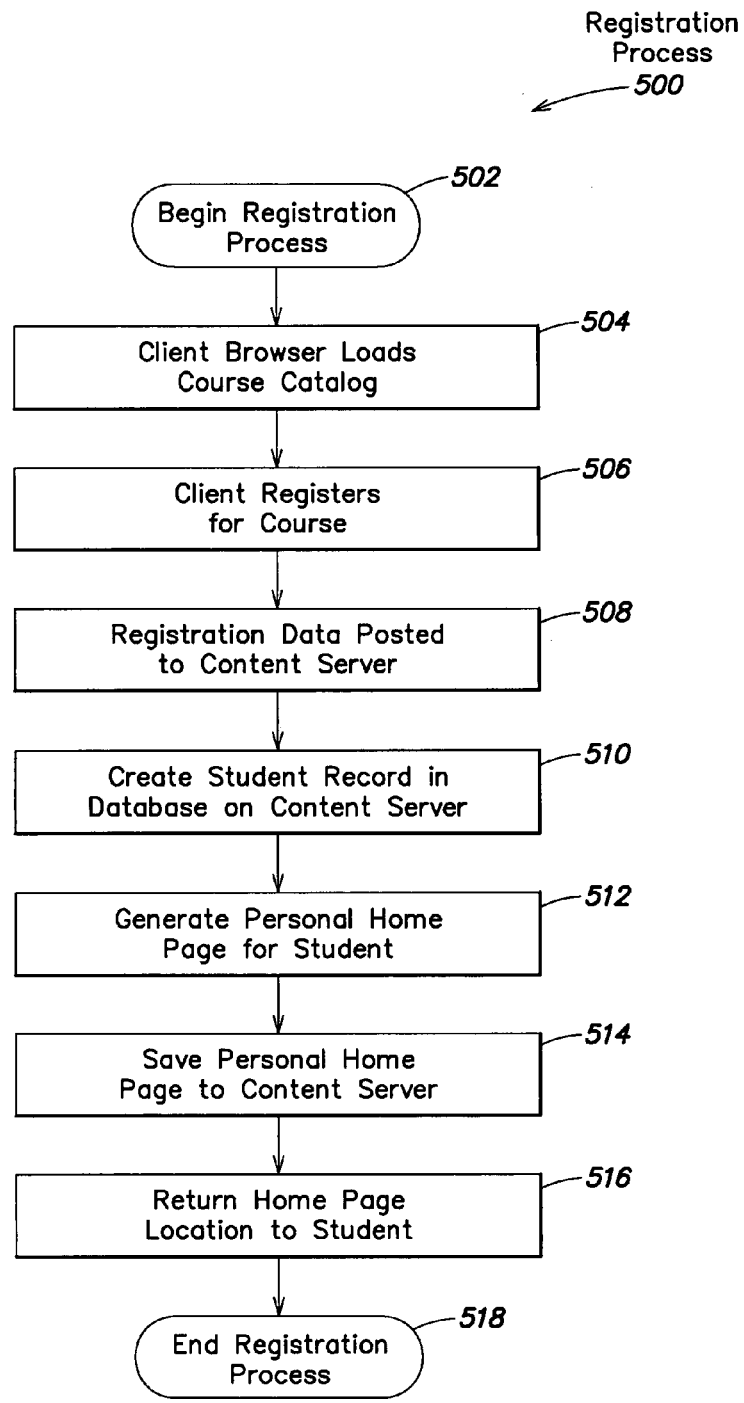
FIG. 5 is a flowchart describing a registration process.

FIG. 4C depicts the relationship between objects located on the client 102 and server 103. As discussed above, the server 103 includes a conference object 431, related to which are a number of room objects 430. For example, server model object 410A "attaches" to a room object 430A by creating a client model 406A in the room object 441A at the client 102, if the server model object 410A did not previously exist. Both the server 103 and each client 102 maintain model objects for each aspect of the class contained in the conference. Thus, the clients are aware of the state of other student's browser programs participating in the conference.

For example, the client 102 maintains a room object 441A which is associated with a room object 430A on the server. The client also maintains client model objects 406A, 406B that are currently associated with the room object 441. When the status of a room object changes, an update request event is generated by the client 102 to the server 103. When the update request event is processed by the server 103, an update event is propagated from the server 103 to all clients associated with room object 441A.

For each client 102 that participates in the same "room", a number of server model objects 410 may exist within the same room. The room object 430 contains a list of server model objects 410 that are attached to the room. To attach to a room, a model object issues a model attach event to the server 103 which will create a corresponding server model object if it does not already exist in the corresponding room on the server 103. Similarly, a model may "detach" from a room by removing a model entry from the list of attached server model objects in the room object 430 and, sends a model detach event to the server 103.

Events are passed between the server 103 and client 102 as objects are updated. Clients within a "room" will not receive events for other rooms, since a student may only be in one room at time. Thus, as shown in FIG. 4C, if a server model 410C is updated, client 102 will not receive an update event, since client 102 is not presently associated with the room object 430B.

Before beginning a course, a student registers for a course, and the browser program 203 provides applets 405 for performing course functions. The student "browses" to a content server on a client 102 using a starting location URL for the course. The content server then returns a starting structured document which contains links for installing the applets 405 and for accessing the course catalog 401. The student first installs the applets 405, which may be downloaded by an installer applet and running the installation applet.

The process by which a student registers for a course will now be described. Once installation of the applets is complete, the student browses to the course catalog 401 via a course catalog link and the registration process 500 begins at step 502. The course catalog is displayed by a JAVA applet that displays a hierarchical list of scheduled course sections at step 504. The student selects a course being registered for and selects a "register" button within a client browser program 203 view displayed to the student. If it is the first time the student has accessed the multimedia system, the student may be presented with a registration form such as an HTML form document, requesting the student name, E-mail address and personal password, among other information at step 506. The student then selects the "Register" button causing the browser program to "post", or send via HTTP, the form data to the content server process 208 at step 508. The content server process 208 receives the form data and executes a JAVA servlet that creates a "student" record in the database 211 on the server 203 at step 510. A "registration" record is also created in the database 211 along with a registration ID that associates the student with the course.

At step 512, the servlet generates a personal "home page" 403 for the student, and, at step 514, saves the page on the content file system 211. A home page is an HTML document that is typically used as a starting page initially loaded by a client browser program 203. A personal home page would generally include identification information for a student and the classes that the student has registered for. The servlet also returns a URL to the personal home page to the student at step 516. At step 518, the registration process 500 is complete.

Note that each servlet-generated page can be based on an HTML template that may be modified by a user. An HTML template may contain parameters that are substituted with actual data by the servlet. The personal home page 403 contains links to each of the course sections for which the student has registered. The personal home page is regenerated whenever the student adds or removes courses. The student joins a class by selecting one of the course links.

Figure 6A:
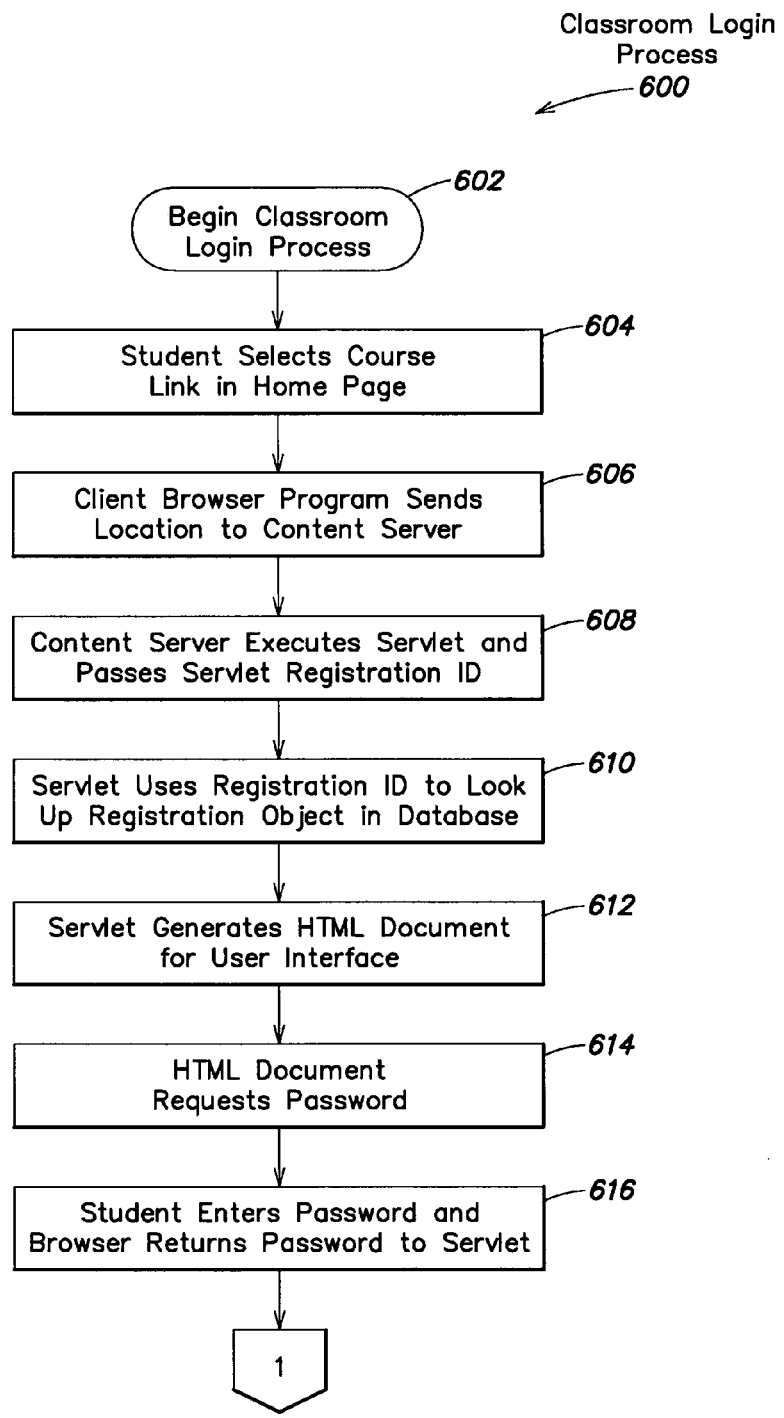
FIG. 6A-6C are flowcharts describing a class room login process.
Figure 6B:
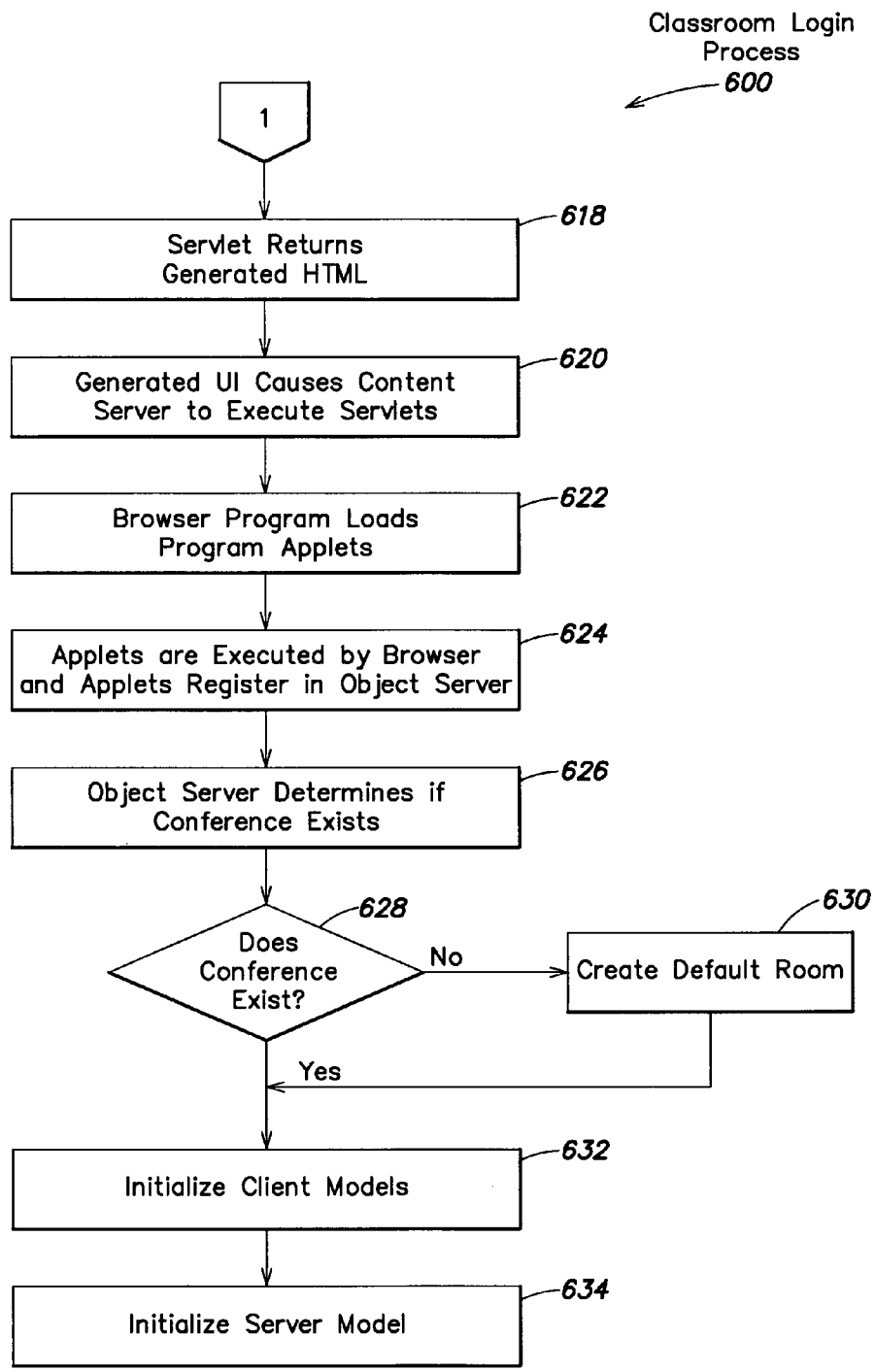
Figure 6C:
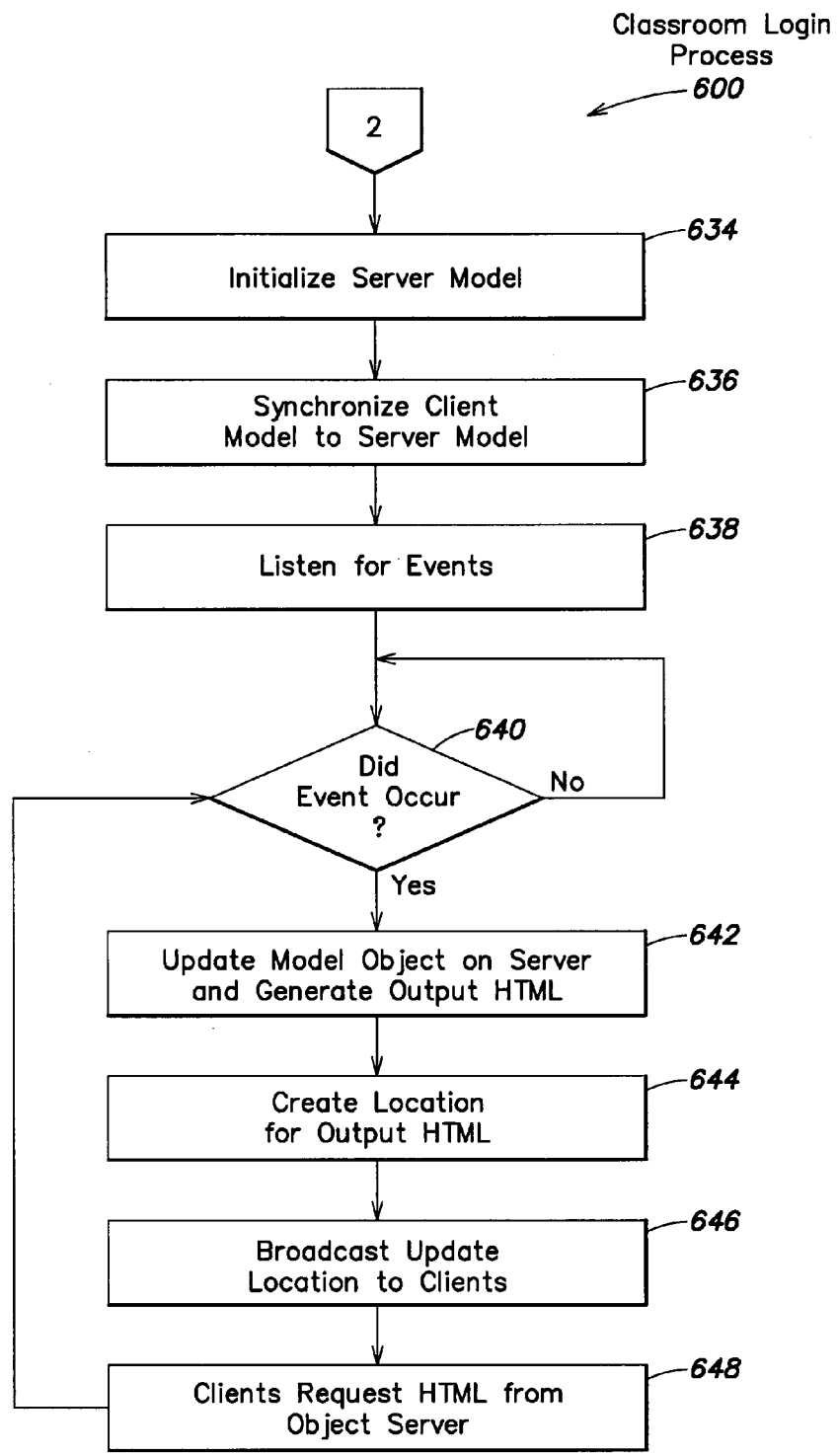

The process 600 for logging into the course will now be described. As shown in FIG. 6A, the process 600 begins at step 602. At step 604, the student selects a course link on the student's personal home page 403. The browser program 203 sends the link to the content server process 208 at step 606. The link includes a reference to the registration object 409 for the course. At step 608, the content server 208 runs a JAVA servlet and passes the servlet the registration ID for the student, which is a unique value. The servlet uses the registration ID to look up the registration object 409 in the database containing the student and course information at step 610. At step 612, the servlet then generates an HTML frame document that defines the user interface layout of a browser program view. This HTML frame document is based on an HTML template and contains the student's ID and the course number. The frame document defines primary frames: the control panel frame, the participant frame, and the media frame described below and as shown in FIG. 9B. The control panel and participant frames are initially left blank. The media frame contains a URL to a Loader HTML document. The Loader HTML document is a template document located on the server that gets the password from the student and "loads" an associated "Loader" applet.

The Loader HTML document contains the student's ID and requests an optional course password at step 614. The student enters the password at step 616 and selects "Login" from the browser program 203 interface. The browser program 203 sends the login data to the content server process 208 to a servlet that verifies the section password and returns a generated HTML document containing the Loader applet at step 618. The Loader applet is run in the student's browser program 203 and checks to make sure the correct applets 405 have been installed (showing an error message if it has not), preloads JAVA class libraries and controls the browser program 203 to display two HTML documents in the control panel and participant frames, respectively. At step 620, these HTML documents cause the content server to run JAVA servlets to generate the HTML documents that contain the JAVA applets 405. These pages are generated from templates and one of them, the participant document contains the registration object ID and the conference ID as a parameters to a "people" applet. The "people" applet is the master applet, that it, an applet that monitors the status of other applets. The conference ID references a conference object in the database that uniquely identifies the section's conference.

At this point, the object server process 210 has not been contacted. At step 622, the browser program 203 loads the participant and control panel HTML documents causing their referenced JAVA applets 405 to load. These applets are loaded simultaneously by the browser program 203 and synchronize their initialization as described below. These applets include an audiotool, the audio controller, a control panel, applet, student input and tool buttons, a rooms controller applet used to display and change the current room, participant control used to display and change the list of students and instructor, syllabus control showing the course's syllabus, that is, the content of the course.

As each applet 405 is executed by the browser program 203, each applet registers itself with the master applet and initializes itself at step 624. Applets, when executed, instantiate objects. The objects define methods, such as an "init" method, which defines variables and other settings for the object. Final initialization is completed when all applets 405 have registered and are ready to accept data. As discussed above, one special applet, the people applet, performs the function of the master applet. The people applet makes the original connection request to the object server process 210. This request contains the conference ID for the course. The object server process 210 determines if the course associated with the conference ID is already created at step 626 and, if it is determined at step 628 that the conference object is not created, the object server 210 creates the conference object and the default "main" room object at step 630. An associated student conference and the default "main" room it contains are created by the framework.

As each applet initializes, it calls an attachModel method on the framework to create and initialize its models in the current room (typically the "main" room) at step 632. An attachModel event is sent to the server to create and initialize the associated server model. The client model then synchronizes its state with the server model's state and starts listening for new events. The client also adds any view objects 407 associated with the model object 406 to be observers of the model's state changes. The creation and initialization of the model objects 406 and view objects 407 are performed by the browser program 203 and are data-driven through applet parameters.

The basic process of requesting a document from the content server that contains JAVA applets, instantiating the applet which then initializes models and views on the client and an associated model on the server 103 synchronizing the client model with the server model's state, and continuing to receive events from the server model to keep the client mode synchronized has now been described.

Figure 7:
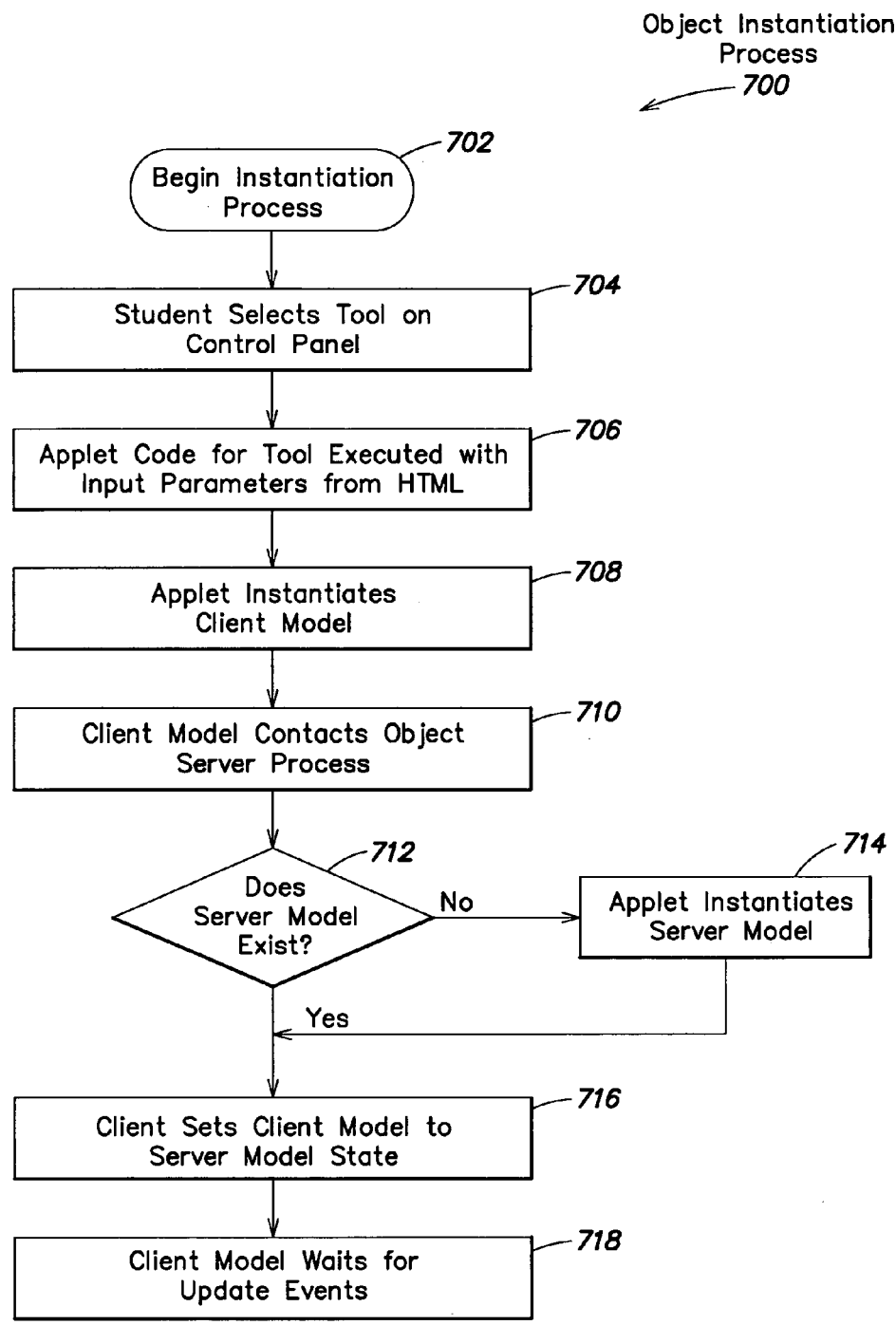
FIG. 7 is a flowchart describing a process by which objects may be instantiated.

As shown in FIG. 7, the process by which objects are instantiated is shown in more detail. At step 702, the object instantiation process 700 begins. As discussed above, in the browser program interface, there may exist a number of different tools, such as a whiteboard tool, that initializes when selected. Associated with the shared whiteboard is a whiteboard model, view, and controller object. On the server and on the clients that are in a same room within a conference, the whiteboard model, view, and controller objects associated with the whiteboard will be instantiated.

To start a tool, a student selects a tool by selecting an icon on the control panel in a browser program window at step 704 (A view of the browser program window is shown in FIG. 9B). The client browser loads applet code for the tool that is selected, and, in step 706 executes the applet with input parameters from an HTML document referenced by the control panel tool icon. The applet, when executed, instantiates the client model object at step 708. At step 710, the client model object contacts the object server process 210 with an attach event. If, at step 712, the server model does not exist, the applet instantiates the server model at step 714. If the server model does exist, the client sets the client model state to the server model state at step 716. At step 718, the object instantiation process 700 is complete, and the client model object waits for update events from the server model object.

Figure 8A:
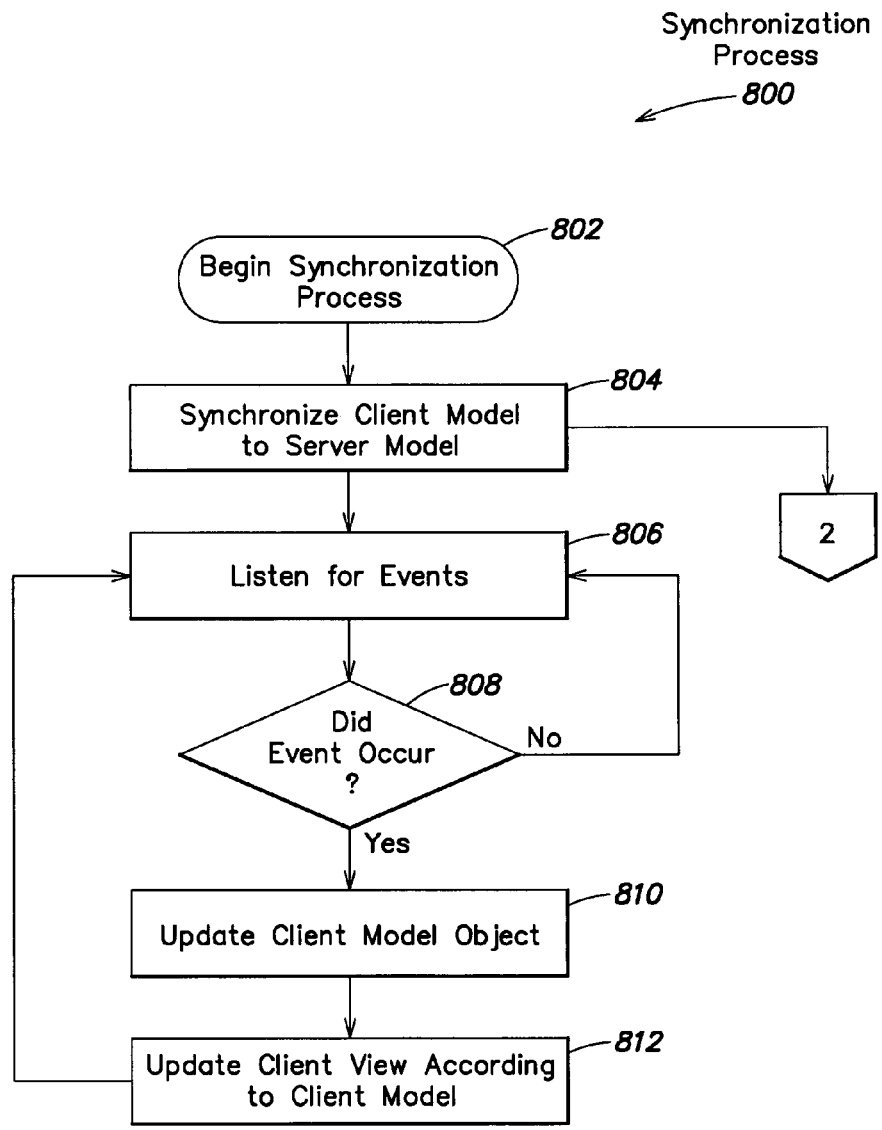
FIGS. 8A–B are flowcharts illustrating a synchronization process.

The classroom synchronization process 800 shown in FIG. 8A will now be described. At step 802, the synchronization process 800 begins. Provided both the client model object and the server model object currently exists, at step 804 the client model object synchronizes its state to the server model object, that is, variable parameters on the client model object are set equal to the variable parameters on the server model object. A client model object may both send update events to a server model object and listen for events originating from the server model object. At step 806, the client model object listens for events. If, at step 808, an event does occur, the model object on the client accepts the event at step 810 and updates itself. At step 812, the client model object updates the client view object according to the change in state in the local client model object. The client continues to listen for events originating from the server 103.

Figure 8B:
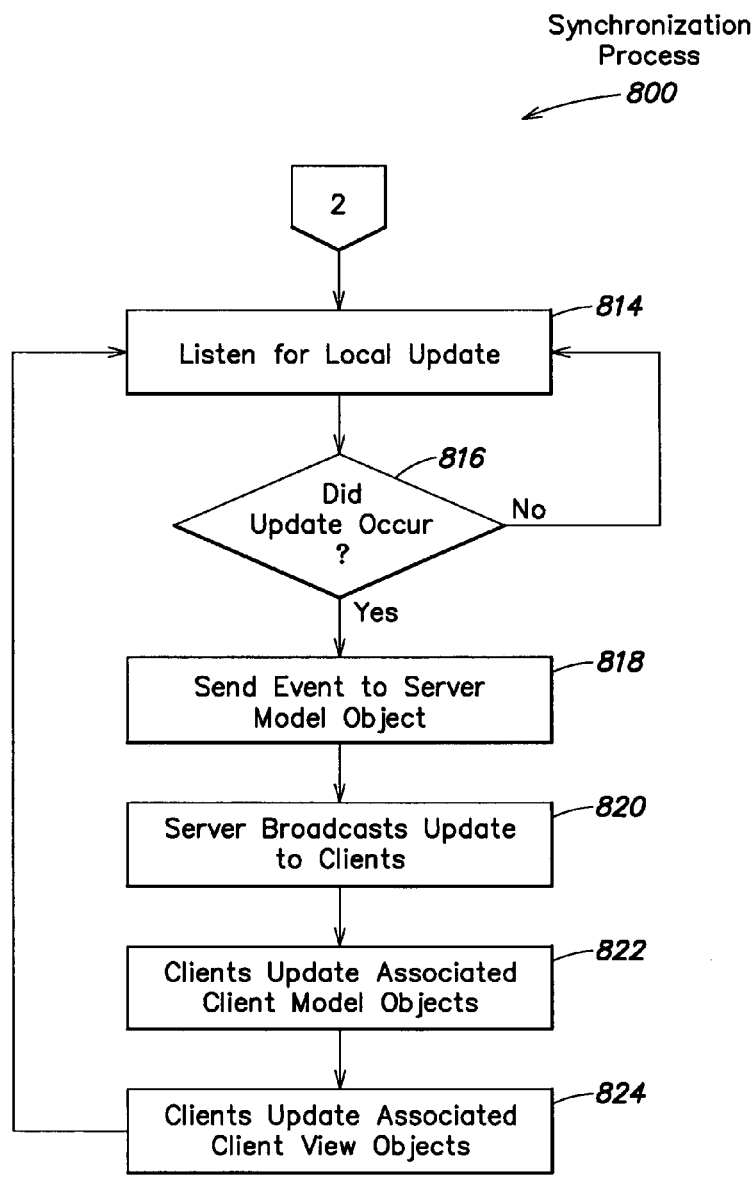

In FIG. 8B, a controller object on the client may provide an update to the server model object, and the change in state of the server model object may be propagated to client model objects. At step 814, the local controller object 408 listens for input from a user to the controller object 408. If, at step 816, a user input provided an update of the local model object 406, an update event is sent to a model object 411 on the server 103. At step 820, the object server process 210 broadcasts an update event to clients 102. At step 822, clients 102 update their client model objects 406 according to the update event, and at step 824, clients 102 update their client view objects 407 according to the update event.

Figure 8C:
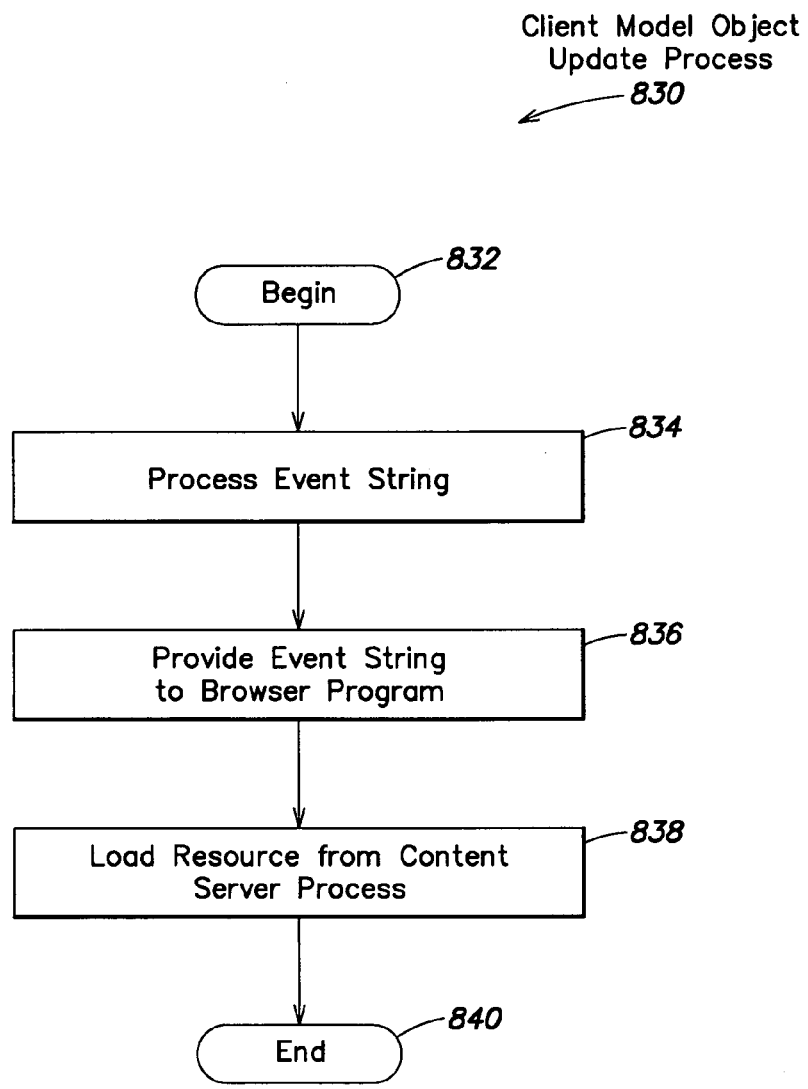
FIG. 8C is a flowchart illustrating a client model object update process.

In FIG. 8C, the client may update an associated client model object at step 822 of FIG. 8B according to the update process 830. At step 832, process 830 begins. In step 834, the model object processes an event message received from server 103. The event message may contain a string which corresponds to a URL of an updated multimedia resource on server 103. The URL string may be provided by a method within the model object to the browser program 203 at step 836. At step 838, the browser program loads the multimedia resource from the content server process 208. As discussed above, the multimedia resource may be an HTML document containing updated content. At step 840, the client model update process 830 ends.

Figure 9A:
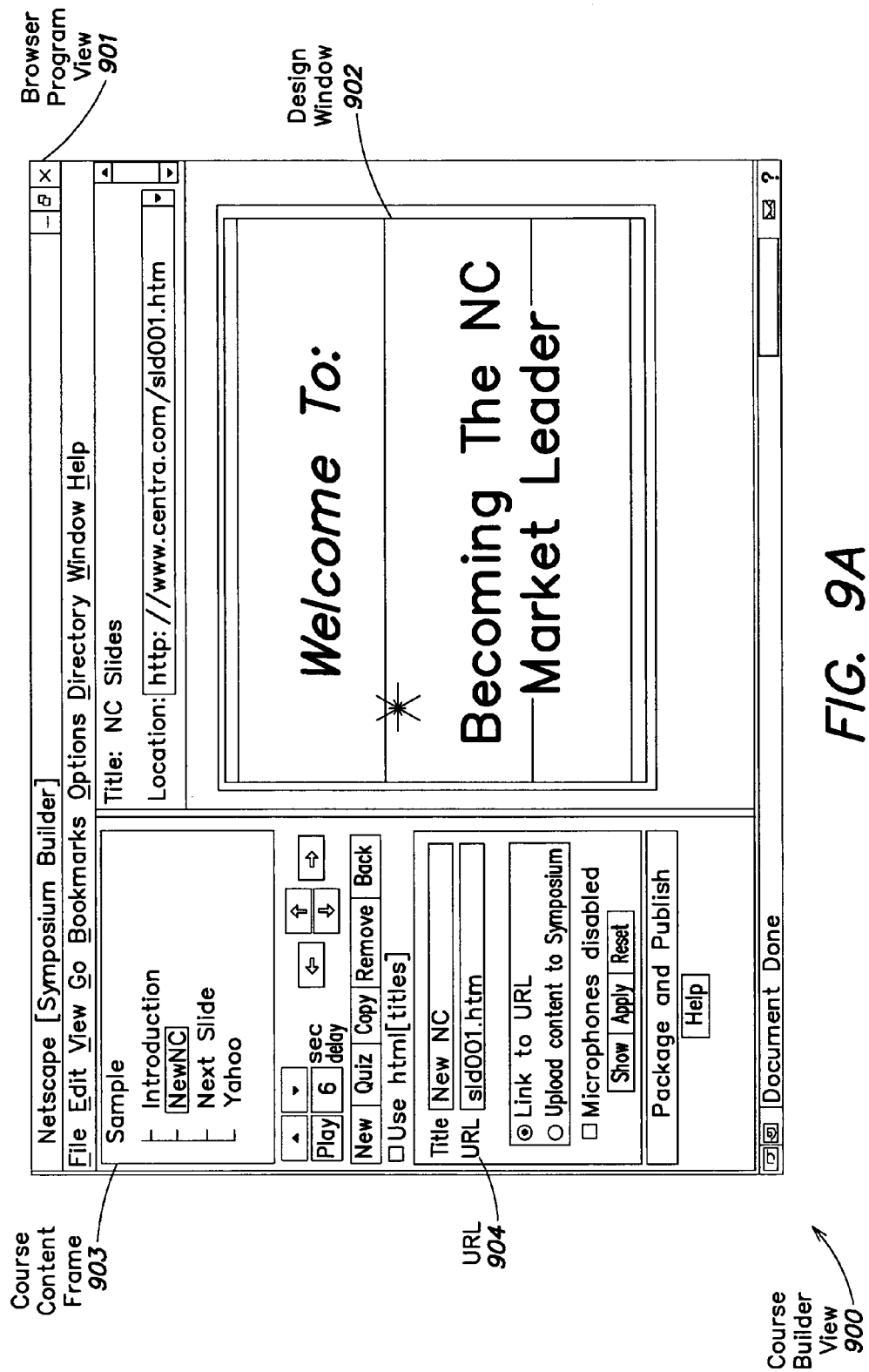
FIG. 9A is a graphic illustration of the course builder interface.
Figure 9B:
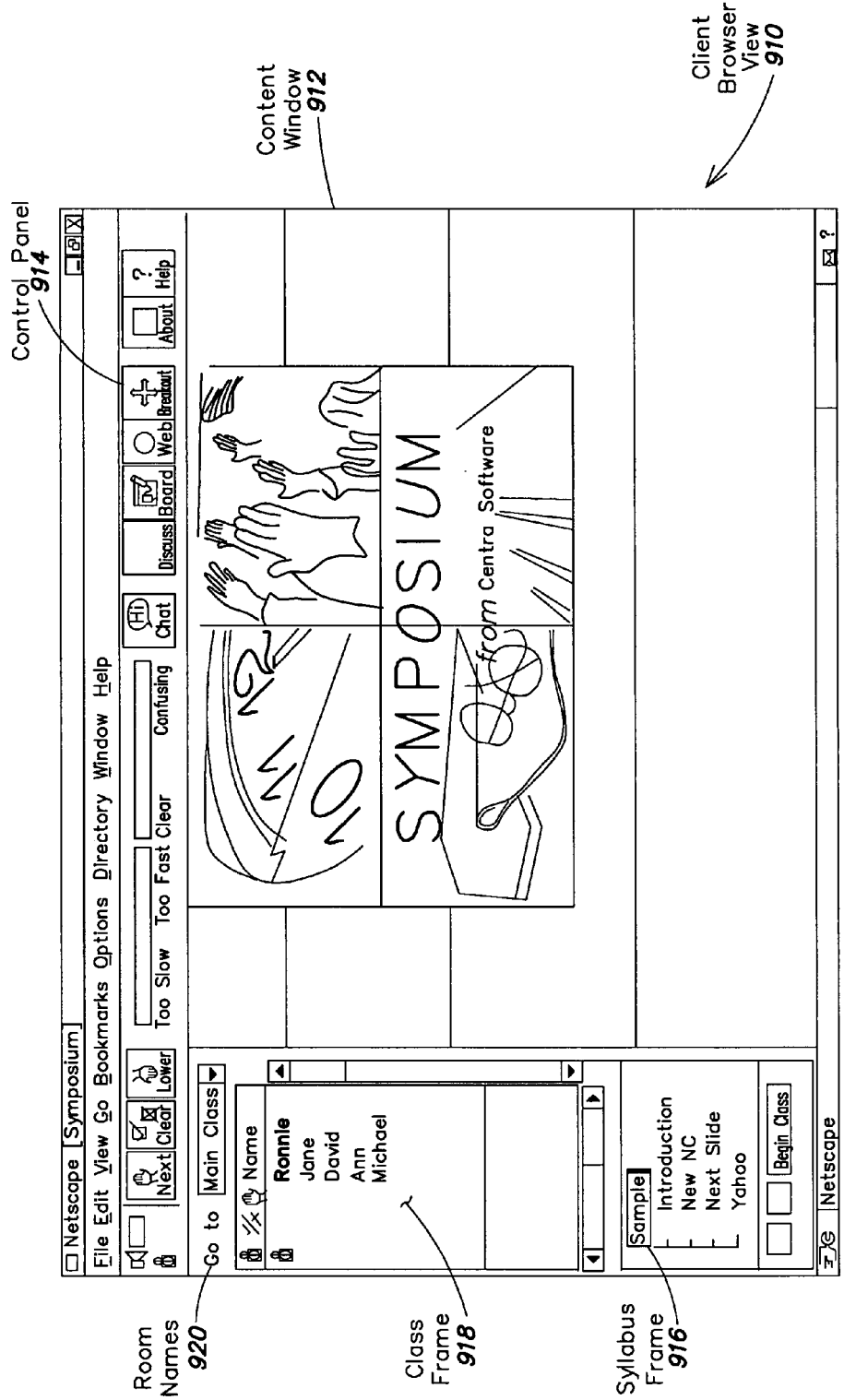
FIG. 9B is a graphic illustration of the client browser interface.

FIG. 9A shows a graphical user interface of a design application referred to as a course editor 900 used to create multimedia content. The multimedia content may be added to a course by running course editor applets running within a browser program 203. FIG. 9A shows a program browser view 901 having a design window 902 through which multimedia content is viewed. The multimedia content could include HTML documents, slides, images, or any multimedia information that may be displayed through a browser program 203. The directory frame 903 shows the sequence of multimedia information to be presented in the course. The browser program view 901 that runs the course builder applet associates course content with a URL 904. This URL 904 may be provided to a client browser program 203 to display in a client view 910 of the course.

The course editor may be stored in a database 212 on the server 103. The multimedia content may be then stored in a file system 211 on the server 103. Object process 208 may provide locations for multimedia content, such as URL information, to the clients 102 for retrieval of a resource. These URL locations may be stored by a database 212 on the server 203, and provided to a client 102 by a server 103. These locations may be URL strings, when provided to a browser program 203, cause the browser program 203 to retrieve an associated resource from the content server process 208.

One such client view 910 is shown in FIG. 9B. The client view 910 includes a content window for displaying multimedia content created in the course builder. The client view 910 also includes a control panel 914 for activating tools, and providing feedback to an instructor conducting a course. The syllabus frame 916 contains the sequence of course information as created in the course content frame 903 of the course builder. As shown, the room name 920 for the shown course is the main class. There may be, however, more than one room within a course. The class frame 918 includes a status of other students participating in the course. Students in the course are represented in the system by model objects 406. Upon a change in state of a student model object 406, an update event will be propagated to other clients, and these clients 102 will update their client views 910 accordingly.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

What is claimed is:

1. A system for synchronizing and serving multimedia content in a distributed network environment the system comprising:

a synchronization server, wherein the synchronization server includes a shared resource, and wherein the shared resource is updated by one of the plurality of clients in real time;

a content server; and a plurality of clients, wherein the synchronization server provides a indication of an update to a multimedia resource to the clients, and the content server provides content information to the clients based upon, wherein the content information is static and in response to, the indication provided by the synchronization server.

2. The system of claim 1, wherein the indication includes location information for an updated multimedia resource.

3. The system of claim 1, wherein the synchronization server is a multitasking system that executes a plurality of processes, each of the plurality of processes capable of processing distributed events generated by each of the clients and synchronizing the distributed events.

4. The system of claim 3, wherein the distributed events update a shared resource, and the distributed events are processed by the synchronization server in the order received by the synchronization server.

5. The system of claim 1, wherein the content information changes in real time.

6. The system of claim 1, wherein the multimedia content is a streaming content.

7. The system of claim 6, wherein the streaming content is at least one of: audio content, video content, a combination of audio and video content, and application data.

8. The system of claim 1, wherein at least two of the plurality of the clients use applications with compatible data formats and wherein the multimedia content is content from the applications with the compatible data formats.

9. A computer-implemented virtual course system adapted to a distributed network environment, the course system comprising:

a content server providing course-related information, wherein the course-related information comprises at least one of the following information: a course cataloci and course instructional materials on a virtual whiteboard;

a plurality of clients adapted to exchange information with the content server; and a synchronization server;

wherein the synchronization server provides an indication of an update to the course-related information to the clients, upon which at least one client sends a request for updated course-related information to the content server and the content server provides the updated course-related information to the at least one client in response to the request.

* * * * *